United States Patent
Tabata et al.

(10) Patent No.: US 8,202,006 B2
(45) Date of Patent: Jun. 19, 2012

(54) SEALING DEVICE, ROLLING BEARING, AND ROLLING BEARING FOR WHEEL

(75) Inventors: Masahiro Tabata, Kashiwara (JP); Kazutoshi Yamamoto, Yamatokoriyama (JP); Kasumi Yamamoto, legal representative, Yamatokoriyama (JP)

(73) Assignee: Koyo Sealing Techno Co., Ltd, Tokushima (JP)

( * ) Notice: Subject to any disclaimer, the term of this patent is extended or adjusted under 35 U.S.C. 154(b) by 515 days.

(21) Appl. No.: 12/311,973

(22) PCT Filed: Oct. 23, 2007

(86) PCT No.: PCT/JP2007/070615
§ 371 (c)(1),
(2), (4) Date: Apr. 21, 2009

(87) PCT Pub. No.: WO2008/050746
PCT Pub. Date: May 2, 2008

(65) Prior Publication Data
US 2010/0104232 A1    Apr. 29, 2010

(30) Foreign Application Priority Data

Oct. 23, 2006  (JP) ................ P2006-287252

(51) Int. Cl.
*F16C 33/78* (2006.01)
(52) U.S. Cl. .............. 384/484; 384/485; 384/486
(58) Field of Classification Search .......... 384/484, 384/485, 486
See application file for complete search history.

(56) References Cited

U.S. PATENT DOCUMENTS

| | | | | | |
|---|---|---|---|---|---|
| 5,407,213 | A | * | 4/1995 | Ouchi et al. | 277/317 |
| 5,431,413 | A | * | 7/1995 | Hajzler | 277/317 |
| 7,731,200 | B2 | * | 6/2010 | Matsui et al. | 277/551 |
| 7,942,584 | B2 | * | 5/2011 | Norimatsu et al. | 384/544 |
| 2004/0086212 | A1 | * | 5/2004 | Ohtsuki et al. | 384/448 |

FOREIGN PATENT DOCUMENTS

| JP | 4-93571 | | 8/1992 |
|---|---|---|---|
| JP | H04 93751 U | * | 8/1992 |
| JP | 2004-169773 | | 6/2004 |
| JP | 2005-16603 | | 1/2005 |
| JP | 2006-118625 | | 5/2006 |
| JP | 2006-161860 | | 6/2006 |

OTHER PUBLICATIONS

Supplementary European Search Report dated Apr. 8, 2011.
Microfilm of the Specification and Drawings Annexed to the Request of Japanese Utility Model Application No. 406141/1990 (Laid-open No. 93571/1992), NOK Corp., (Aug. 13, 1992). International Search Report for PCT/JP2007/070615, mailed Dec. 11, 2007.

* cited by examiner

*Primary Examiner* — Patrick Mackey
(74) *Attorney, Agent, or Firm* — Nixon & Vanderhye P.C.

(57) ABSTRACT

Prior to assembly of an elastic member (51) to a slinger (52), a radially inner surface (58) of a first portion (56) is formed in a concave shape, and a radially inner surface (59) of a second portion (57) is formed in a conical shape. The second axial lip (55) is adapted such that, after the elastic member (51) is assembled to the slinger (52) and when a second axial lip (55) is in a not-yet-worn state, the second axial lip (55) does not come into contact with a fixation section (65) of the slinger (52).

11 Claims, 5 Drawing Sheets

SEALING DEVICE, ROLLING BEARING, AND ROLLING BEARING FOR WHEEL

This application is the U.S. national phase of International Application No. PCT/JP2007/070615 filed 23 Oct. 2007, which designated the U.S. and claims priority to Japan Application No. 2006-287252 filed 23 Oct. 2006, the entire contents of each of which are hereby incorporated by reference.

TECHNICAL FIELD

The present invention relates to a sealing device and in particular to a sealing device preferably used for a rolling bearing in which a raceway member having a raceway surface consists of two or more cylindrical members only, a rolling bearing for a wheel, a water pump, or a motor using a roll bearing. Furthermore, the present invention relates to a rolling bearing and a rolling bearing for a wheel.

BACKGROUND ART

Conventional sealing devices include one described in JP 4-93571 U (Patent Document 1).

The sealing device is located between an inner race and an outer race of a rolling bearing for a wheel. The sealing device has a metal core, an elastic member fixed to the metal core, a slinger of L-shaped cross section, and a garter spring. The slinger consists of an axially-extending portion and a radially extending portion, and the elastic member has a radial lip which always slides on the axially-extending portion, a first axial lip which always slides on the radially extending portion, and a second axial lip which is positioned radially inside the first axial lip and slides on the radially extending portion. The second axial lip has an annular groove on a radially outer surface.

The garter spring has been inserted in the annular groove of the second axial lip. The garter spring urges or presses the second axial lip radially inward.

In the sealing device, the second axial lip is not in contact with the axially-extending portion while the second axial lip is in a non-worn state, and once the second axial lip becomes worn and the pressing force against the radially extending portion of the second axial lip becomes a predetermined force or less, part of a portion facing the axially-extending portion of the second axial lip comes into contact with the axially-extending portion and constitutes a radial seal.

The second axial lip in its non-worn state functions as an axial seal, while part of the portion facing the axially-extending portion of the second axial lip in its worn state functions as a radial seal. In this way, the sealing device is able to maintain a continuing stable seal function.

Against this background, there has been a demand for a significant reduction in the torque of a sealing device which seals rolling elements of a rolling bearing for a wheel from the outside. The conventional sealing device has a problem that the life of the second axial lip is short.

Patent Document 1: JP 4-93571 U (FIG. 1)

SUMMARY OF INVENTION

Technical Problem

It is therefore an object of the present invention to provide a sealing device, a rolling bearing, and a rolling bearing for a wheel, which are capable of significant reduction in torque and have a long life.

Solution to Problem

In order to solve the problem, sealing device according to an aspect of the present invention comprises:

a metal core which is fixed to and around a first bearing ring and has a radially extending portion extending in a radial direction of the first bearing ring;

a slinger having a cylindrical fixation section fixed to and around a second bearing ring and a flange section which extends in the radial direction from the fixation section and is positioned more outside in an axial direction of the second bearing ring than the radially extending portion of the metal core; and an elastic member having a base fixed to the radially extending portion of the metal core and a lip section which is connected with the base and is slidable on the slinger, wherein the lip section comprises a first axial lip which extends from the base toward the first bearing ring in the radial direction and outward in the axial direction and is slidable on the flange section, and a second axial lip which is positioned radially on the second bearing ring side of the first axial lip at a distance in the radial direction from the first axial lip and is slidable on the flange section;

wherein the second axial lip comprises a first portion which extends from the base toward the second bearing ring in the radial direction and outward in the axial direction, and a second portion which extends from an axially outer end of the first portion toward the first bearing ring in the radial direction and outward in the axial direction and is slidable on the flange section;

wherein in a state before the elastic member is assembled to the slinger, a surface that the first portion has on the second bearing ring side in the radial direction is a concave surface, while a surface that the second portion has on the second bearing ring side in the radial direction is a conical surface or a convex surface; and wherein in a state after the elastic member has been assembled to the slinger, the second axial lip is positioned at a distance in the radial direction from the fixation section of the slinger while the second axial lip is in a non-worn state, and part of a portion facing the fixation section of the slinger of the second axial lip is slidable on the fixation section of the slinger while the second axial lip is in a worn state and in a state that pressing force against the flange section of the second axial lip has decreased by a predetermined amount or more due to wear of the second axial lip.

The term "radially extending" refers to extending in a direction with at least a radially extending component. For this reason, the term "radially extending" refers to not only extending in a direction with only a radial extending component but also extending in a combined direction with both of a radial extending component and an axial extending component.

Furthermore, in this specification, a "conical surface" is intended to be included in a concave surface, but not in a convex surface.

Regarding a so-called pack seal type sealing device having an elastic member and a slinger of L-shaped cross section, the sealing device having two radial lips and one axial lip, the inventors investigated the magnitude of torque caused by contact loads of the lips. As a result, the inventors discovered that the ratio of torque caused by the contact load of the two radial lips to the total torque reaches as much as the order of 80 percent and most of the torque is caused by the contact load of a radial seal.

Furthermore, it was found that, in the sealing device having the conventional configuration, the deformation of the portion on the metal core side of the radially inner axial lip is large when the assembly process is carried out, so that stress concentration occurs on that portion and the durability of that portion becomes small, resulting in a short life of the sealing device.

According to the present invention, the elastic member is in the state of being in noncontact with the fixation section of the slinger and having no radial lip until the pressing force against the flange section of the second axial lip decreases by a given magnitude or more, so that the torque can be significantly reduced until the pressing force against the flange section of the second axial lip decreases by the given magnitude or more. Thus, the fuel economy of an automobile or the like having this sealing device can be reduced.

Furthermore, according to the present invention, the surface on the second bearing ring side in the radial direction of the first portion assumes a concave shape before the elastic member is assembled to the slinger. Therefore, it is not necessary to deform a base side part of the first portion of the second axial lip intensively and excessively to bring the second axial lip into noncontact with the fixation section of the slinger in the assembly initial stage, in contrast to the case that the surface on the second bearing ring side in the radial direction of the first portion is a convex surface. Instead, the second axial lip can be brought into noncontact with the fixation section of the slinger by deforming the whole of the first portion almost evenly in its extending direction. In other words, locally excessive stress is not applied to part of the first portion, so that the durability of the second axial lip can be remarkably increased and the life of the sealing device can be thus increased.

Furthermore, according to the present invention, the surface on the second bearing ring side in the radial direction of the second portion is a conical surface or a convex surface before the elastic member is built in the slinger, so that the contact pressure between the second axial lip and the flange section of the slinger can be reduced and wear of the second axial lip can be thus restrained as compared with the case that the surface on the second bearing ring side in the radial direction of the second portion is a concave surface. Thus, a time until the second axial lip comes into contact with the fixation section of the slinger is prolonged, so that the state that the torque is remarkably small is sustained for a long term, as compared with the case that the surface on the second bearing ring side in the radial direction of the second portion is a concave surface Furthermore, according to the present invention, part of the portion facing the fixation section of the slinger of the second axial lip comes into contact with the fixation section of the slinger and slides on the fixation section in the sate that the pressing force against the flange section of the second axial lip has decreased by predetermined force or more due to wear of the second portion of the second axial lip. Therefore, in a rolling bearing for a wheel, even if the wear of the second axial lip advances, foreign matter such as muddy water from the outside can be restrained from entering a compartment where rolling elements are located.

In one embodiment, a surface that the second portion has on the second bearing ring side in the radial direction is smoothly continuous.

The term "smoothly continuous" herein means that the surface on the second bearing ring side in the radial direction of the second portion is in the state of being able to be differentiated from one end to the other end in an axial section of the sealing device.

According to the embodiment, the surface on the second bearing ring side in the radial direction of the second portion is smoothly continuous, so that the stress caused by the deformation of the second axial lip at built-in time can be almost evenly distributed and exerted to the whole of the second portion. Furthermore, the second axial lip can be easily deformed radially outward in the assembly process, and a clearance can be created easily and accurately between the second axial lip and the fixation section of the slinger in the non-worn state of the first and second axial lips.

In one embodiment, in the state before the elastic member is assembled to the slinger, the surface that the first portion has on the second bearing ring side in the radial direction has, in a cross section of the elastic member taken in the axial direction, an increasing curvature as going outward in the axial direction.

The wording "increasing curvature as going outward in the axial direction" or similar wording is intended to cover such a case that the surface on the second bearing ring side in the radial direction of the first portion includes a portion the curvature of which is partially constant as going outward in the axial direction. For this reason, for example, the expression covers a case that the surface on the second bearing ring side in the radial direction of the first portion consists of a conical surface positioned on the base side and a concave surface which is smoothly continued from the conical surface and is defined by part of an ellipsoid of revolution.

According to this embodiment, in the axial section of the elastic member, the curvature of the surface radially on the second bearing ring side of the first portion increases as going outward in the axial direction before the elastic member is assembled to the slinger, so that the stress caused by the deformation of the second axial lip at the assembly time can be almost evenly distributed over and shared by the whole of the first portion, and the concentration of local stress is surely prevented from occurring in the first portion when the second axial lip is in noncontact with the fixation section.

In one embodiment, force to be received by the second axial lip is only force from the slinger.

According to this embodiment, there is no clamping member such as a garter spring pressing a portion facing the fixation section of the slinger of the second axial lip against the fixation section of the slinger, so that the portion facing the fixation section of the slinger of the second axial lip can be easily distanced from the fixation section in the assembly process when the second axial lip is pressed against the flange section of the slinger, as compared with the case that there is a clamping member such as a garter spring pressing the portion facing the fixation section of the slinger of the second axial lip.

A rolling bearing according to an aspect of the present invention comprises:

a sealing device according to the present invention;
an inner ring having at least one raceway surface;
an outer ring having at least one raceway surface; and
a plurality of rolling elements located between the raceway surface of the inner ring and the raceway surface of the outer ring, wherein the sealing device is located so as to seal an opening on at least one side in the axial direction of a rolling elements compartment which is defined between an outer periphery of the inner ring and an inner periphery of the outer ring and which contains the rolling elements;

wherein the slinger of the sealing device is fixed to the inner ring; and wherein a seal member including the elastic member and the metal core of the sealing device is fixed to the outer ring.

According to the present invention, because the roller bearing has a sealing device according to the present invention, the torque of the sealing device can be reduced at an operating time, and the fuel economy of a machine installed with the rolling bearing can be thus reduced.

A rolling bearing for a wheel according to another aspect of the present invention comprises:

a sealing device according to the present invention;

an inner shaft having a first raceway surface;

an inner ring fixed to the inner shaft and having a second raceway surface;

an outer ring having a third raceway surface and a fourth raceway surface;

a plurality of first rolling elements located between the first raceway surface and the third raceway surface; and a plurality of second rolling elements located between the second raceway surface and the fourth raceway surface, wherein the sealing device is located so as to seal an opening on at least one side in the axial direction of a rolling elements compartment which contains the rolling elements, the rolling elements compartment being defined by an inner periphery of the outer ring and portions facing the inner periphery of the outer ring in the radial direction of outer peripheries of each of the inner shaft and the inner ring;

wherein the slinger of the sealing device is fixed to the inner ring; and wherein a seal member including the elastic member and the metal core of the sealing device is fixed to the outer ring.

According to the present invention, because the roller bearing for a wheel has a sealing device according to the present invention, the torque of the sealing device can be reduced at an operating time, and the fuel economy of a vehicle, such as an automobile, installed with the rolling bearing can be thus reduced.

Advantageous Effects of Invention

According to the present invention, a long life sealing device is provided, and the torque of the sealing device can be remarkably reduced, so that the fuel economy of an automobile or the like equipped with the sealing device can be reduced.

BRIEF DESCRIPTION OF DRAWINGS

The present invention will become more fully understood from the detailed description given hereinbelow and the accompanying drawings which are given by way of illustration only, and thus are not intended to limit the present invention, and wherein.

REFERENCE SIGNS LIST

2: Inner shaft
3: Outer ring
4: Inner ring
5: First ball
6: Second ball
8: First sealing device
9: Second sealing device
50, 150: Metal core
51: Elastic member
52, 152: Slinger
53: Base
54: First axial lip
55: Second axial lip
56: First portion
57: Second portion
58: Radially inner surface of the first portion
59: Radially inner surface of the second portion
60: Axially-extending portion
61: Radially extending portion
65: Fixation section
66: Flange section
99: Sealing device

DESCRIPTION OF EMBODIMENTS

The present invention will be described in detail below with reference to embodiments shown in the figures.

Figure 1:
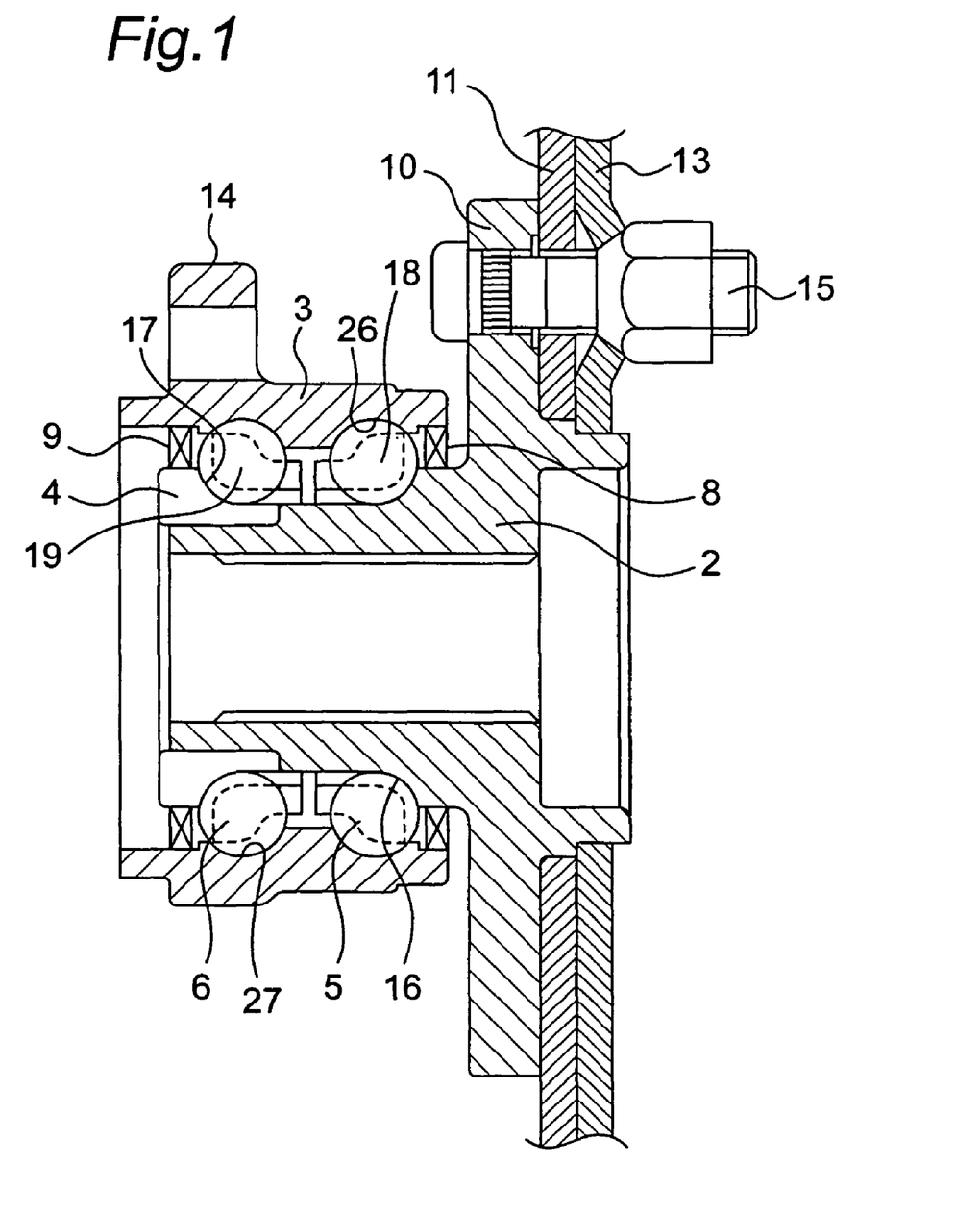
FIG. 1 is an axial sectional view of a rolling bearing for a wheel having a sealing device according to an embodiment of the present invention.

FIG. 1 is an axial sectional view of a rolling bearing for a wheel having a sealing device according to an embodiment of the present invention.

The rolling bearing for a wheel has an inner shaft 2, an outer ring 3, an inner ring 4, a plurality of first balls 5, a plurality of second balls 6, a first sealing device 8 according to an embodiment of the present invention, and a second sealing device 9 according to an embodiment of the present invention. The first balls 5 are first rolling elements, and the second balls 6 are second rolling elements.

The inner shaft 2 has, on one axial end of it, a radially-spreading brake disk mounting flange 10 shaped like a disk for mounting a brake disk 11. A plurality of through holes for bolts are formed on a concentric circle whose center is substantially the center of the brake disk mounting flange 10. The brake disk mounting flange 10, the brake disk 11, and a wheel member 13 are fixed together by a plurality of bolts 15 running therethrough, with the brake disk 11 in contact with the brake disk mounting flange 10 and with the wheel member 13 in contact with the brake disk 11.

An inner ring 4 is fit around and fixed to the other axial end of the inner shaft 2. An angular first raceway groove 16 providing a first raceway surface is formed on the inner shaft 2 between the inner ring 4 and the brake disk mounting flange 10, while an angular second raceway groove 17 providing a second raceway surface is formed on the outer periphery of the inner ring 4.

The outer ring 3 is located more on the other axial end side of the inner shaft 2 than the brake disk mounting flange 10 so as to radially face the inner shaft 2. The outer ring 3 has, on the other axial end side, a radially-spreading flange 14 for mounting on a car body. A plurality of through holes for insertion of bolts for mounting the flange 14 on a car body (e.g. a knuckle) are formed in the flange 14 shaped like a disk. The outer ring 3 has an angular third raceway groove 26 providing a third raceway surface and an angular fourth raceway groove 27 providing a fourth raceway surface. Those grooves 26 and 27 are located on the inner periphery of the outer ring 3 with an axial distance in between. Also, the angular third raceway groove 26 is positioned more on the one axial end side than the angular fourth raceway groove 27.

The first balls 5 are located at predetermined intervals in the circumferential direction while being kept by a cage 18 between the first raceway groove 16 of the inner shaft 2 and the third raceway groove 26 of the outer ring 3. The second balls 6 are located at predetermined intervals in the circumferential direction while being kept by a cage 19 between the second raceway groove 17 of the inner ring 4 and the fourth raceway groove 27 of the outer ring 3.

A first sealing device 8 is located near an opening on the one axial end side (brake disk mounting flange 10 side) between the inner shaft 2 and the outer ring 3. The first sealing device 8 seals the opening on the one axial end side between the inner shaft 2 and the outer ring 3. On the other hand, a second sealing device 9 is located near an opening on the other axial end side (opposite to the brake disk mounting flange 10 side) between the inner ring 4 and the outer ring 3. The second sealing device 9 seals the opening on the other axial end side between the inner ring 4 and the outer ring 3. The second sealing device 9 has the same structure as the first sealing device 8.

Figure 2:
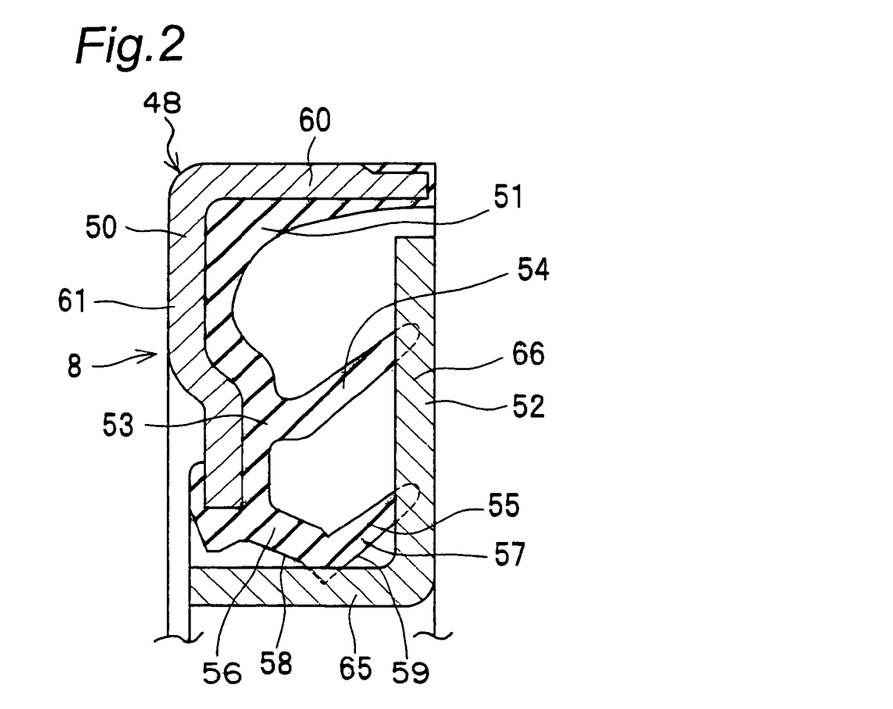
FIG. 2 is an enlarged cross-sectional view of the whole of the sealing device of the embodiment.
Figure 3:
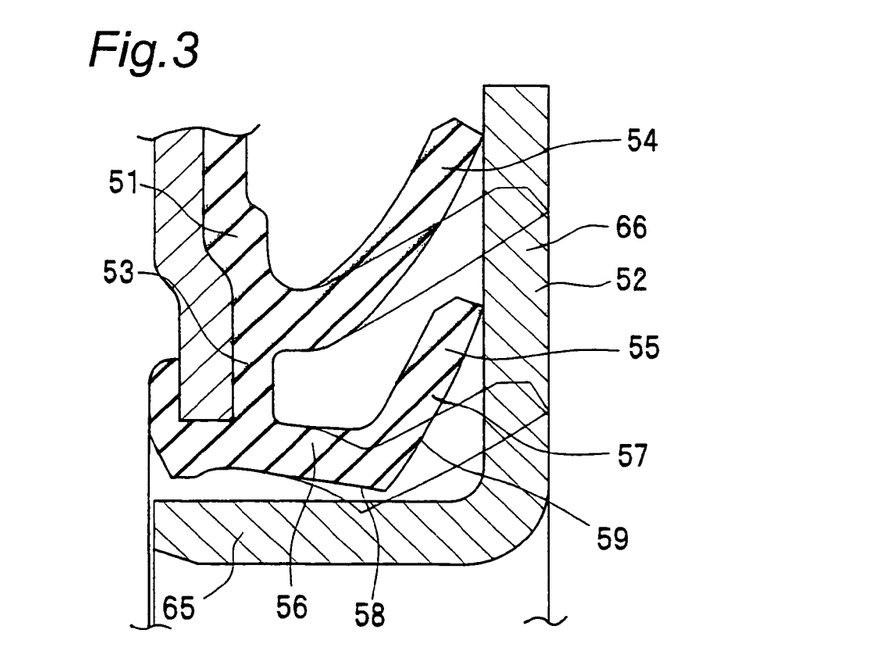
FIG. 3 is an enlarged cross-sectional view of the surroundings of the first and second axial lips of the sealing device of the embodiment.

FIGS. 2 and 3 are sectional views illustrating the structure of the first sealing device 8 in detail. In particular, FIG. 2 is an axial sectional view showing the positional relations between a metal core 50, an elastic member 51, and a slinger 52 in the assembly of the sealing device, wherein the elastic member 51 is shown in a position that the elastic member 51 would assume when the elastic member 51 does not receive any force from the slinger 52, namely, when the slinger 52 is absent. On the other hand, FIG. 3 is a sectional view showing the positions of the elastic member 51 and the slinger 52 in the state that the elastic member 51 has been built in the slinger 52 and that the elastic member 51 is not yet worn. The second sealing device 9 has the same structure as the first sealing device 8. The second sealing device 9 is located near an opening on the other axial end side between the inner ring 4 and the outer ring 3 in the state of being axially reversed left to right in FIGS. 2 and 3. The description of the second sealing device 9 is omitted by applying the description of the first sealing device 8.

As shown in FIG. 2, the first sealing device (simply referred to as the "sealing device" hereinafter) 8 has the metal core 50, the elastic member 51, and the slinger 52. The metal core 50 and the elastic member 51 are fixed to each other and integrated. The metal core 50 and the elastic member 51 constitute a seal member 48.

The metal core 50 is formed generally in the shape of a ring. The metal core 50 is shaped like a letter L in cross section. The metal core consists of a cylindrical axially-extending portion 60 and a radially extending portion 61. The axially-extending portion 60 is fit in and fixed to the inner periphery of the outer ring 3 (shown in FIG. 1 but not shown in FIG. 2) as a first bearing ring. The radially extending portion 61 extends radially inward from the other axial end side (left side in FIG. 2) of the inner periphery of the axially-extending portion 60.

The slinger 52 is formed generally in the shape of a ring. The slinger 52 is shaped like a letter L in cross section. The slinger 52 has a cylindrical fixation section 65 and a flange section 66 connected with the fixation section 65. The fixation section 65 is fit around and fixed to the outer periphery of the inner shaft 2 as a second bearing ring. It is needless to say that in the second sealing device 9, the inner ring 4 is a part serving as the second bearing ring to which the slinger is fixed. The flange section 66 extends radially outward from the axial outer end (i.e., a right side end on the paper) of the outer periphery of the fixation section 65. The flange section 66 is positioned axially outside of the radially extending portion 61 of the metal core 50. Most of the flange section 66 except radially inner part of it axially faces the radially extending portion 61 through a gap.

The elastic member is formed in the shape of a ring. The elastic member 51 is fixed to the metal core 50 so as to cover the entire surface of the inner periphery of the axially-extending portion 60 and the entire surface of the axially outer end face of the radially extending portion 61 connected with the inner periphery of the axially-extending portion 60. The elastic member has a base 53, a first axial lip 54, and a second axial lip 55. The elastic member 51 is specifically made of rubber. As the rubber, for example, nitrile rubber, hydrogenated nitrile rubber, acrylic rubber, silicon rubber, and fluororubber can be preferably used.

The base 53 is located along the inner periphery of the axially-extending portion 60 and the axially outer end face of the radially extending portion 61. The base 53 is fixed to the inner periphery of the axially-extending portion 60 and the outer end face of the radially extending portion 61. The first axial lip 54 extends from the base 53 toward the outer ring 3 (see FIG. 1) and axially outward (toward the flange section 66).

The second axial lip 55 is positioned on the inner shaft 2 (see FIG. 1) side in the radial direction (radially inside) of the first axial lip 54 at a radial distance from the first axial lip 54. The second axial lip 55 has a first portion 56 and a second portion 57. The first portion 56 extends from the base radially toward the inner shaft 2 and axially outward. The second portion 57 is connected with the axially outer end of the first portion 56 and extends radially toward the outer ring 3 and axially outward.

As shown in FIG. 2, the position that the elastic member 51 would take in the assembly when it is assumed that the elastic member 51 does not receive any force from the slinger 52, overlaps the position of the slinger 52. In particular, an axially outer end portion of the first axial lip 54 of the elastic member 51 and an axially outer end portion of the second axial lip 55 of the elastic member 51 overlap the flange section of the slinger 52, and a bend portion at the junction between the first portion 56 and the second portion 57 of the second axial lip 55 (i.e., part of a portion radially facing the fixation section 65 of the second axial lip 55) overlaps the fixation section 65 of the slinger 52.

Furthermore, as shown in FIG. 2, before the elastic member 51 is combined with the slinger 52, the radially inner surface 58 of the first portion 56 forms a concave surface, while the radially inner surface 59 of the second portion 57 forms a conical surface. In the axial section, the curvature of the radially inner surface 58 of the first portion 56 increases as going axially outward (i.e., toward the flange section 66). Specifically, in the axial section of the elastic member, the radially inner surface 58 of the first portion 56 consists of a generally conical surface portion positioned on the base 53 side and a surface portion which is smoothly connected with the generally conical surface portion and is defined by part of an ellipsoid of revolution having an increasing curvature as going axially outward (i.e., toward the flange section 66).

In the axial section, the radially inner surface 59 of the second portion 57 can be differentiated from one end to the other end and is smoothly continuous.

As shown in FIG. 3, the sealing device is assembled and mounted such that the first axial lip 54 and the second portion 57 of the second axial lip 55 slide on the flange section 66 of the slinger 52 by a relative revolution between the seal member 48 and the slinger 52 substantially around the axis of the rolling bearing for a wheel. Furthermore, as shown in FIG. 3, in a non-worn state after the sealing device is assembled and mounted in position, the second axial lip 55 is positioned at a radial distance from the fixation section 65 of the slinger 52. In other words, as shown in FIGS. 2 and 3, when the sealing device is assembled, the metal core 50 and the slinger 52 are moved axially and relatively to each other so that the radially extending portion 61 of the metal core 50 and the flange section 66 of the slinger 52 approach each other, and thereby the first axial lip 54 and the second portion 57 of the second axial lip 55 move radially outward along the surface of the flange section 66 of the slinger 52, so that the bend portion between the first portion 56 and the second portion 57 moves radially outward away from the outer periphery of the fixation section 65. In this embodiment, there is no clamping member such as a garter spring pressing the bend portion radially inward, so that the bend portion can be easily and securely allowed to get away from the outer periphery of the fixation section 65 radially toward the outer ring 3. If there is a clamping member such as a garter spring pressing the bend portion radially inward, the bend portion may not separate from the outer periphery of the fixation section radially toward the outer ring.

As described above, the position of the bend portion in the case that it is assumed that the elastic member 51 does not receive force from the slinger 52 is set such that the bend portion overlaps the fixation section 65. When the pressing force against the flange section 66 of the second axial lip 55 has decreased by a predetermined magnitude or more due to wear of the second portion 57 of the second axial lip 55, the bend portion comes into contact with the fixation section 65 of the slinger 52 and slides on the fixation section 65 by a relative revolution between the seal member 48 and the slinger 52 around the axis of the rolling bearing for a wheel. In other words, the bend portion acts as a radial lip while the sealing device is in the state that the pressing force against the flange section 66 of the second axial lip 55 has decreased by the predetermined magnitude or more due to the wear of the second portion 57 of the second axial lip 55.

A space surrounded by the first axial lip 54, the second axial lip 55, and the slinger 52 and a space surrounded by the second axial lip 55 and the slinger 52 are filled with a proper amount of grease as lubricant, or the grease is applied to the surfaces surrounding the spaces, and thereby the sliding face between the first axial lip 54 and the slinger 52 and the sliding face between the second axial lip 55 and the slinger 52 are lubricated. Furthermore, in FIG. 3, a rolling elements compartment positioned axially inside (i.e., a left side of the drawing sheet) of the first sealing device 8 communicates with a region surrounded by the second axial lip 55 and the slinger 52 and contains rolling elements (balls 18 and 19 in this embodiment). This rolling elements compartment is filled with lubricant (grease in this embodiment).

Figure 4:
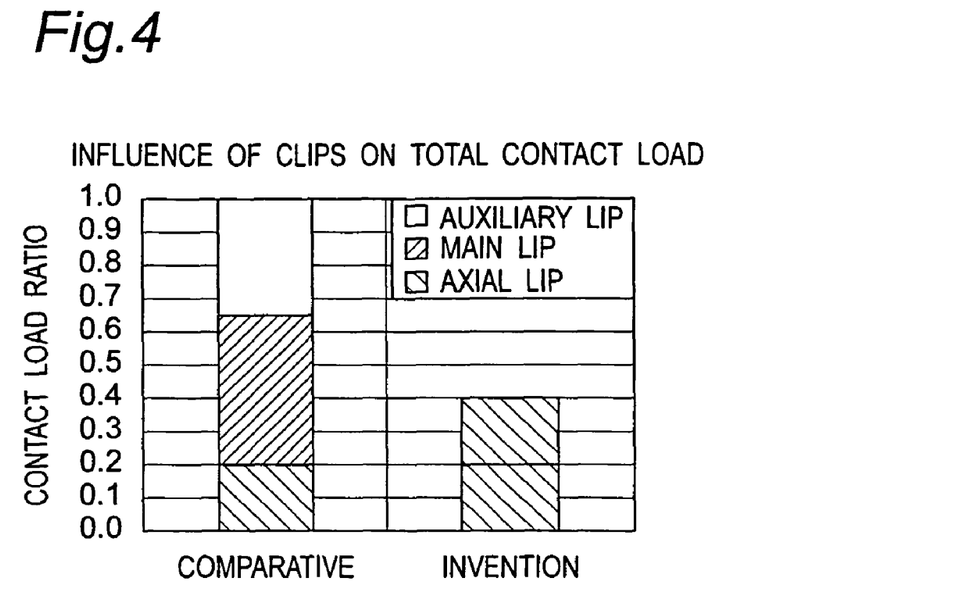
FIG. 4 shows, in the case that lips are in a non-worn state in each of a comparative sealing device and the sealing device of the embodiment, the ratio of a contact load of each of lips to the total contact load, and the ratio of the total contact load of the sealing device of the embodiment to the total contact load of the comparative sealing device.

FIG. 4 shows the ratio of a contact load of each lip to the total contact load in both a comparative sealing device and a sealing device according to the above embodiment which are in their non-worn state, as well as the ratio of the total contact load of the sealing device of the above embodiment to the total contact load of the comparative sealing device. The result shown in FIG. 4 is a result in one experimental example The comparative sealing device is a so-called pack seal type sealing device (generally indicated by reference numeral 270 in FIG. 7) composed of a metal core 250, an elastic member 251, and a slinger 252 of L-shaped cross section, the sealing device having two radial lips (an auxiliary lip 273 and a main lip 272) and one axial lip 271.

Figure 7:
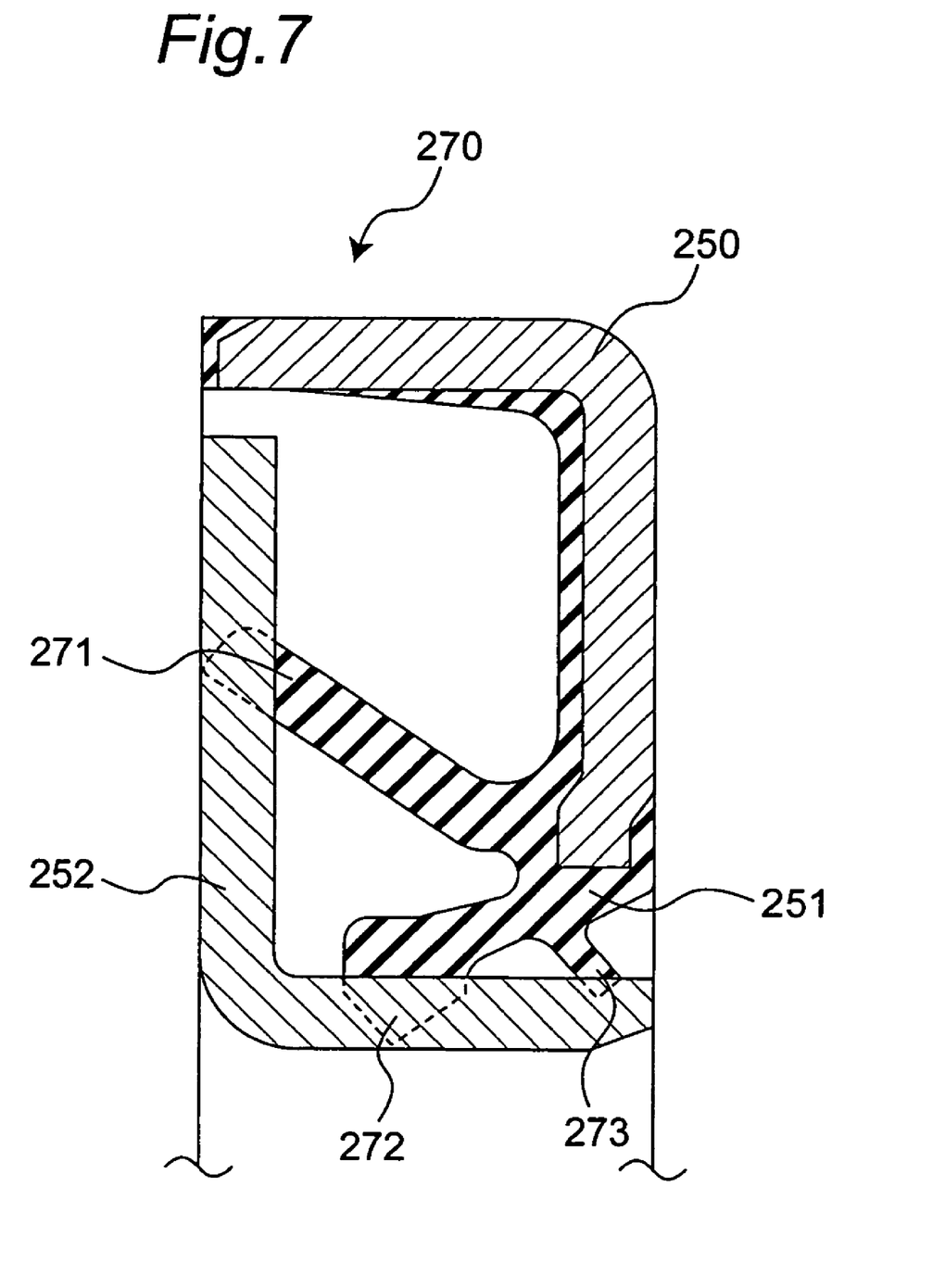
FIG. 7 is an enlarged cross-sectional view of the whole of the comparative sealing device.

The position of the elastic member 251 shown in FIG. 7 is a position that the elastic member 251 would take when the metal core 250 has a predetermined position relative to the slinger 252 in the assembly but when it is assumed that the elastic member 251 does not receive force from the slinger 252.

As shown in FIG. 4, in the comparative sealing device 270, the ratio of the contact load of the radial lips to the total contact load reaches as much as 80 percent, while the ratio of the contact load of the axial lip to the total contact load is the order of 20 percent. For this reason, if the contact load of the radial lips can be reduced, the torque can be significantly reduced.

The total contact load of the sealing device of the embodiment having two axial lips but no radial lip reaches only 40 percent of the total contact load of the comparative one, thus being reduced significantly.

Figure 5:
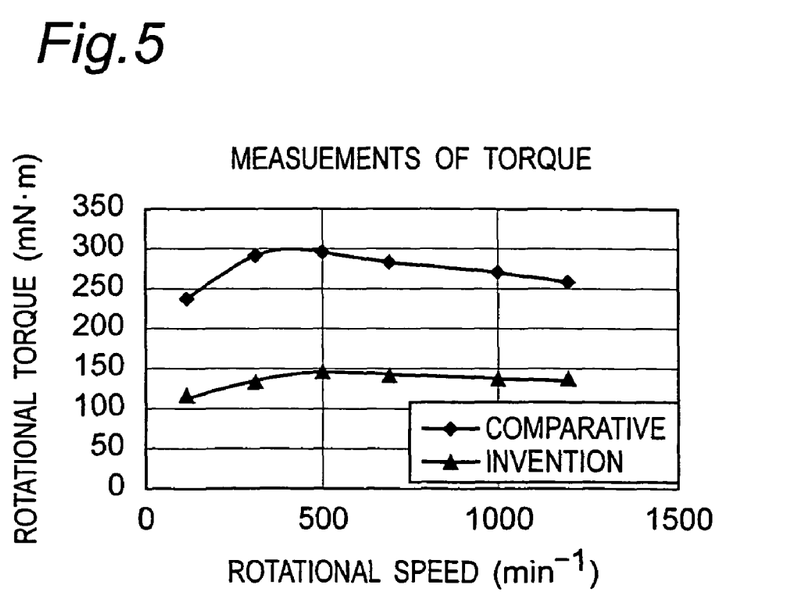
FIG. 5 shows the relation between the number of revolutions and the rotational torque in one experimental example for the comparative sealing device and the sealing device of the embodiment.

FIG. 5 shows the relation between the number of revolutions and the rotational torque in one experimental example for each of the comparative sealing device 270 and the sealing device of the embodiment.

The torque of the sealing device of the above embodiment is of the order of 50 percent of the torque of the comparative sealing device from a low number of revolutions to a high number of revolutions. In other words, the torque of the sealing device of the embodiment is significantly smaller than that of the comparative sealing device. This experiment was carried out without using lubricant for the sealing device of the embodiment as well as the comparative sealing device 270.

According to the sealing device of the embodiment, the elastic member 51 is in the state of being in noncontact with the fixation section 65 of the slinger 52 and having no radial lip until the pressing force against the flange section 66 of the second axial lip 55 decreases by predetermined force or more, so that the torque can be significantly reduced by the order of 50 percent as compared with a sealing device having a radial lip until the pressing force against the flange section 66 of the second axial lip 55 decreases by predetermined force or more. Thus, the fuel economy of an automobile or the like having this sealing device can be reduced, the amount of $CO_2$ emissions of an automobile or the like having this sealing device can be reduced, and global warming can be restrained.

Furthermore, according to the sealing device of the above embodiment, the radially inner surface 58 of the first portion 56 is a concave surface before the elastic member 51 is assembled to the slinger 52. Therefore, when assembling, it is not necessary to deform only part on the base 53 side of the first portion 56 of the second axial lip 55 intensively and excessively to bring the non-worn second axial lip 55 into noncontact state with the fixation section 65 of the slinger 52, in contrast to the case that the first portion is convex. And, the second axial lip 55 can be brought into noncontact with the fixation section 65 of the slinger 52 by deforming the whole of the first portion 56 almost evenly in its extending direction. In other words, excessive stress is not applied locally to part of the first portion 56, so that the durability of the second axial lip 55 can be remarkably increased and the life of the sealing device can be thus increased.

Furthermore, according to the sealing device of the above embodiment, the radially inner surface 59 of the second portion 57 is a conical surface before the elastic member 51 is assembled to the slinger 52, so that the contact pressure between the second axial lip 55 and the flange section 66 of the slinger 52 can be reduced and wear of the second axial lip 55 can be thus restrained, as compared with the case that the radially inner surface of the second portion is a concave surface. Thus, a time until the bend portion of the second axial lip 55 comes into contact with the fixation section 65 of the slinger 52 can be increased, so that the state that the torque is remarkably small can be sustained for a long term, as compared with the case that the radially inner surface of the second portion is a concave surface.

Furthermore, according to the sealing device of the above embodiment, the radially inner surface 59 of the second portion 57 is smoothly continuous, so that the stress caused by the deformation of the second axial lip 55 during the assembly process can be almost evenly distributed to the whole of the second portion 57 and thus shared evenly by the whole of the second portion 57. Furthermore, the second axial lip 55 can be easily deformed radially outward during the assembly process, and a predetermined clearance can be created easily and accurately between the non-worn second axial lip 55 and the fixation section 65 of the slinger 52.

Furthermore, according to the sealing device of the above embodiment, prior to the assembly of the elastic member to the slinger, the curvature of the radially inner surface of the first portion 56 in its axial section increases as going axially outward. Therefore, the stress caused by the deformation of the second axial lip 55 during the assembly process can be almost evenly distributed to the whole of the first portion 56 and thus evenly shared by the whole of the second portion 57, and the concentration of local stress can be surely prevented from occurring in the first portion 56. Thus, the life of the sealing device can be further extended.

Furthermore, according to the sealing device of the embodiment, the bend portion comes into contact with the fixation section 65 of the slinger 52 and slides on the fixation section 65 after the pressing force against the flange section 66 of the second axial lip 55 has decreased by a predetermined magnitude or more due to the wear of the second portion 57 of the second axial lip 55. Therefore, even if the wear of the second axial lip 55 advances, muddy water from the outside is restrained from entering the balls compartment containing the balls 8 and 9 of the rolling bearing for a wheel.

Furthermore, according to the sealing device of the above embodiment, force received by the second axial lip 55 is only force from the slinger 52, and there is no clamping member such as a garter spring pressing a portion facing the fixation section 65 of the slinger 52 of the second axial lip 55 against the fixation section 65 of the slinger 52. Thus, as compared with the case that there is a clamping member such as a garter spring pressing a portion of the second axial lip 55 against the fixation section 65 of the slinger 52, the portion of the second axial lip 55 facing the fixation section 65 of the slinger 52 of the second axial lip 55 can be easily distanced from the fixation section 65 in the assembly process in which the second axial lip 55 is pressed against the flange section 66 of the slinger 52.

Furthermore, since the rolling bearing for a wheel of the above embodiment has the sealing devices 8 and 9 according to the present invention, the torque of the sealing devices 8 and 9 can be reduced at an operating time, and the fuel economy of a vehicle such as an automobile having the rolling bearing for a wheel of the above embodiment can be thus reduced.

In the sealing device of the above embodiment, the radially inner surface 59 of the second portion 57 is a conical surface before the assembly process. However, in the present invention, the radially inner surface of the second portion may be a convex surface before the assembly process.

Furthermore, in the sealing device of the above embodiment, in the axial section of the elastic member, the radially inner concave surface 58 of the first portion 56 consists of a generally conical surface portion positioned on the base 53 side and a surface portion which is smoothly connected with the generally conical surface portion and is defined by part of an ellipsoid of revolution having an increasing curvature as going axially outward (i.e., toward the flange section 66). However, in the present invention, the whole of the radially inner surface of the first portion 56 may be, in the axial section, a conical surface or a part of an ellipsoid of revolution having an increasing curvature as going axially outward (i.e., toward the flange section). In the present invention, the radially inner surface of the first portion may have any shape, in the axial section, provided that the curvature of it increases as going axially outward (toward the flange section).

Furthermore, in the rolling bearing for a wheel, the sealing devices 8 and 9 according to the above embodiment of the present invention are located near the openings on axial both sides of the rolling elements (balls) compartment (filled with lubricant). However, a sealing device according to the present invention may be located only near an opening on axial one side of the rolling elements (balls) compartment (filled with lubricant) of the rolling bearing for a wheel. The rolling elements may not be balls but rollers and may be both of balls and rollers. When the rolling elements are rollers, the rollers may include conical rollers and cylindrical rollers. But, the conical rollers are preferable. The second sealing device 9 of the above embodiment of the present invention is located near an opening on the other axial end side between the inner ring 4 and the outer ring 3 on which side the brake disk mounting flange 10 is not present. Therefore, the slinger 50 and the seal member 48 can be easily fitted around the inner ring 4 and the outer ring 3, respectively.

Figure 6:
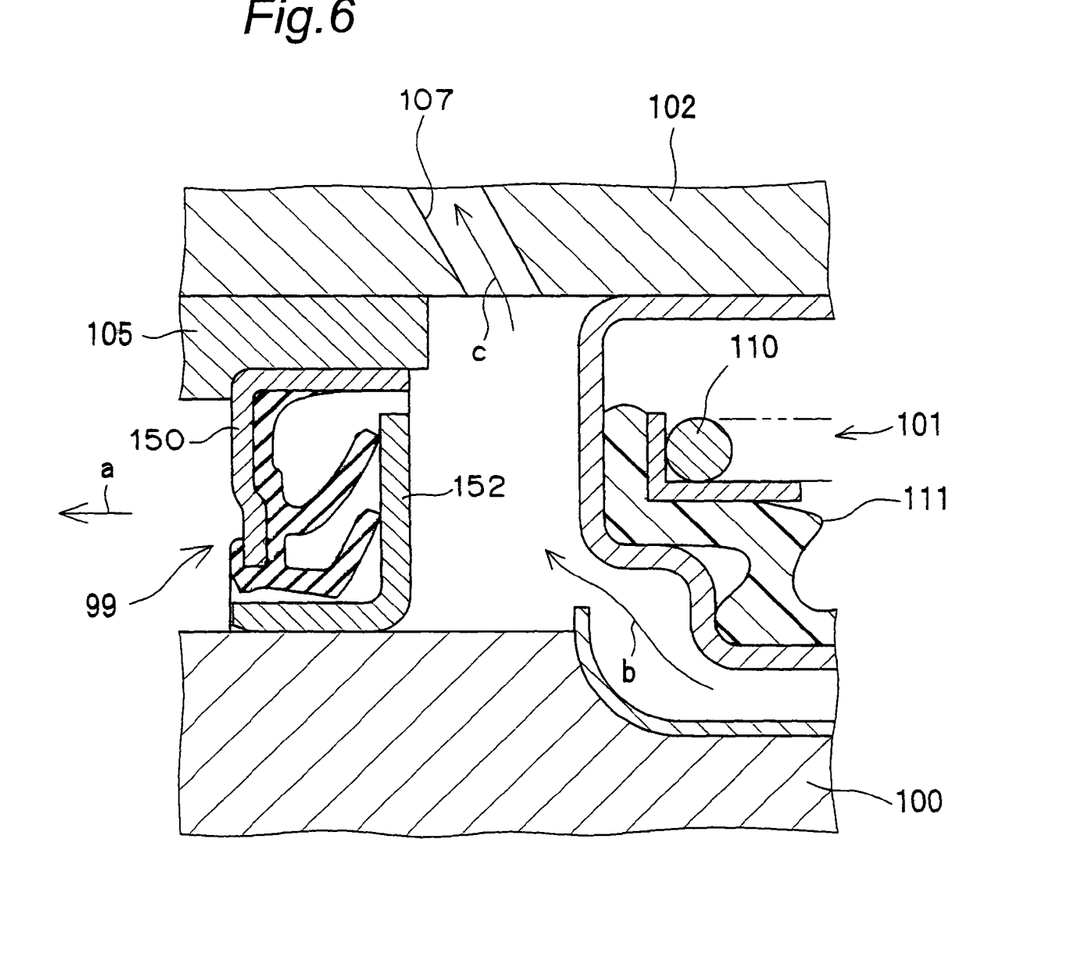
FIG. 6 is an enlarged cross-sectional view of the surroundings of a sealing device according to the present invention included in a water pump.

FIG. 6 is an enlarged cross-sectional view of the surroundings of a sealing device 99, according to the present invention, included in a water pump.

The water pump has a pump shaft 100, a mechanical seal 101, a pump housing 102, an outer ring 105, and a sealing device 99 according to the present invention. The pump housing 102 has a drain hole 107 penetrating the pump housing 102. Furthermore, the outer ring 105 is fit in and fixed to the inner periphery of the pump housing 102.

The pump shaft 100, the outer ring 105, and the sealing device 99 make up part of a water pump bearing of the water pump. In other words, the inner periphery of the outer ring 105 is formed with a deep raceway groove and a cylindrical raceway surface, although not shown in FIG. 6, which are located with an axial distance in between on a side shown with an arrow "a" in FIG. 6 of the sealing device and arranged in this order from the sealing device 99. Also, the outer periphery of the pump shaft 100 is formed with a deep raceway groove and a cylindrical raceway surface, although not shown in FIG. 6, which are located with an axial distance in between on the side shown with the arrow "a" in FIG. 6 of the sealing device and arranged in this order from the sealing device 99.

A plurality of balls held by a cage are located at predetermined intervals in the circumferential direction between the raceway groove of the outer ring 105 and the raceway groove of the pump shaft 100. Furthermore, a plurality of cylindrical rollers held by a cage are located at predetermined intervals in the circumferential direction between the cylindrical raceway surface of the outer ring 105 and the cylindrical raceway surface of the pump shaft 100.

A metal core 150 of the sealing device 99 is fit in and fixed to the inner periphery of the outer ring 105 as the first bearing ring, while a slinger 152 of the sealing device 99 is fit on and fixed to the outer periphery of the pump shaft 100 as the second bearing ring. The sealing device 99 seals an opening between the outer ring 105 and the pump shaft 100 on the mechanical seal 101 side of the water pump bearing. In this way, cooling water in the pump chamber leaking through the mechanical seal 101 in the direction shown with an arrow "b" is prevented from entering the inside of the water pump bearing.

The cooling water leaking from the pump chamber is surely discharged to the outside in the direction shown with an arrow c through the drain hole 107 formed in the pump housing 102. In FIG. 6, the reference numeral 111 denotes a rubber sleeve of the mechanical seal 101, and the reference numeral 110 denotes a coil spring of the mechanical seal 101.

When a sealing device according to the present invention is installed in a water pump as shown in FIG. 6, the torque of the water pump bearing in the water pump is reduced and the fuel economy of an automobile or the like having the water pump is thus reduced.

In the above embodiments, the sealing device according to the present invention is assembled to a rolling bearing for a wheel or in a water pump. However, a sealing device according to the present invention may be located so as to seal at least one opening between an outer ring and an inner ring in a rolling bearing in which an outer ring and an inner ring serve as raceway members having a raceway surface. Furthermore, a sealing device according to the present invention may be installed in a rolling bearing provided between a rotor member and a stator member of a motor. In this case, the operation cost of the motor can be reduced. A sealing device according to the present invention can be installed in any machine provided that the machine has a first member having an inner periphery and a second member having an outer periphery and the first member faces the second member in the radial direction of the inner periphery of the first member. And, the operation cost of such a machine provided with the sealing device according to the present invention can be reduced.

Embodiments of the invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A sealing device comprising:
a metal core which is fixed to and around a first bearing ring and has a radially extending portion extending in a radial direction of the first bearing ring;
a slinger having a cylindrical fixation section fixed to and around a second bearing ring and a flange section which extends in the radial direction from the fixation section and is positioned more outside in an axial direction of the second bearing ring than the radially extending portion of the metal core; and
an elastic member having a base fixed to the radially extending portion of the metal core and a lip section which is connected with the base and is slidable on the slinger,
wherein the lip section comprises:
a first axial lip which extends from the base toward the first bearing ring in the radial direction and outward in the axial direction and is slidable on the flange section, and
a second axial lip which is positioned radially on the second bearing ring side of the first axial lip at a distance in the radial direction from the first axial lip and is slidable on the flange section;
wherein the second axial lip comprises:
a first portion which extends from the base toward the second bearing ring in the radial direction and outward in the axial direction, and
a second portion which extends from an axially outer end of the first portion toward the first bearing ring in the radial direction and outward in the axial direction and is slidable on the flange section;
wherein in a state before the elastic member is assembled to the slinger, a surface that the first portion has on the second bearing ring side in the radial direction is a concave surface, while a surface that the second portion has on the second bearing ring side in the radial direction is a conical surface or a convex surface;
wherein in a state after the elastic member has been assembled to the slinger, the second axial lip is positioned at a distance in the radial direction from the fixation section of the slinger while the second axial lip is in a non-worn state, and part of a portion facing the fixation section of the slinger of the second axial lip is slidable on the fixation section of the slinger while the second axial lip is in a worn state and in a state that pressing force against the flange section of the second axial lip has decreased by a predetermined amount or more due to wear of the second axial lip; and
wherein force to be received by the second axial lip is only force from the slinger.

2. A sealing device as claimed in claim 1, wherein a surface that the second portion has on the second bearing ring side in the radial direction is smoothly continuous.

3. A sealing device as claimed in claim 1, wherein in the state before the elastic member is assembled to the slinger, the surface radially on the second bearing ring side of the first portion has, in a cross section of the elastic member taken in the axial direction, an increasing curvature as going outward in the axial direction.

4. A rolling bearing comprising:
a sealing device as claimed in claim 1;
an inner ring having at least one raceway surface;
an outer ring having at least one raceway surface; and
a plurality of rolling elements located between the raceway surface of the inner ring and the raceway surface of the outer ring,
wherein the sealing device is located so as to seal an opening on at least one side in the axial direction of a rolling elements compartment which is defined between an outer periphery of the inner ring and an inner periphery of the outer ring and which contains the rolling elements;
wherein the slinger of the sealing device is fixed to the inner ring; and
wherein a seal member including the elastic member and the metal core of the sealing device is fixed to the outer ring.

5. A rolling bearing for a wheel comprising:
a sealing device as claimed in claim 1;
an inner shaft having a first raceway surface;
an inner ring fixed to the inner shaft and having a second raceway surface;

an outer ring having a third raceway surface and a fourth raceway surface;
a plurality of first rolling elements located between the first raceway surface and the third raceway surface; and
a plurality of second rolling elements located between the second raceway surface and the fourth raceway surface,
wherein the sealing device is located so as to seal an opening on at least one side in the axial direction of a rolling elements compartment which contains the rolling elements, the rolling elements compartment being defined by an inner periphery of the outer ring and portions facing the inner periphery of the outer ring in the radial direction of outer peripheries of each of the inner shaft and the inner ring;
wherein the slinger of the sealing device is fixed to the inner ring; and
wherein a seal member including the elastic member and the metal core of the sealing device is fixed to the outer ring.

6. A sealing device as claimed in claim 1, wherein there is no exterior clamping force from any spring that presses the second lip toward the fixation section of the slinger.

7. A sealing device comprising:
a metal core which is fixed to and around a first bearing ring and has a radially extending portion extending in a radial direction of the first bearing ring;
a slinger having a cylindrical fixation section fixed to and around a second bearing ring and a flange section which extends in the radial direction from the fixation section and is positioned more outside in an axial direction of the second bearing ring than the radially extending portion of the metal core; and
an elastic member having a base fixed to the radially extending portion of the metal core and a lip section which is connected with the base and is slidable on the slinger,
wherein the lip section comprises:
a first axial lip which extends from the base toward the first bearing ring in the radial direction and outward in the axial direction and is slidable on the flange section, and
a second axial lip which is positioned radially on the second bearing ring side of the first axial lip at a distance in the radial direction from the first axial lip and is slidable on the flange section;
wherein the second axial lip consists essentially of only:
a first portion which extends from the base toward the second bearing ring in the radial direction and outward in the axial direction, and a second portion which extends from an axially outer end of the first portion toward the first bearing ring in the radial direction and outward in the axial direction and is slidable on the flange section, a surface that the first portion has on the second bearing side in the radial direction being continuous to a surface that the second portion has on the second bearing side in the radial direction;
wherein in a state before the elastic member is assembled to the slinger, the surface that the first portion has on the second bearing ring side in the radial direction is a concave surface, while the surface that the second portion has on the second bearing ring side in the radial direction is a conical surface or a convex surface;
wherein in a state after the elastic member has been assembled to the slinger, a portion facing the fixation section of the slinger of the second axial lip is positioned at a distance in the radial direction from the fixation section of the slinger while the second portion that slides on the flange section of the slinger is in a non-worn state, and part of the portion facing the fixation section of the slinger of the second axial lip is slidable on the fixation section of the slinger while the second portion that slides on the flange section of the slinger is in a worn state and in a state that pressing force against the flange section of the second portion has decreased by a predetermined amount or more due to wear of the second portion, wherein force to be received by the second axial lip is only force from the slinger.

8. A sealing device as claimed in claim 7, wherein the surface that the second portion has on the second bearing ring side in the radial direction is smoothly continuous.

9. A sealing device as claimed in claim 7, wherein in the state before the elastic member is assembled to the slinger, the surface radially on the second bearing ring side of the first portion has, in a cross section of the elastic member taken in the axial direction, an increasing curvature as going outward in the axial direction.

10. A rolling bearing comprising:
a sealing device as claimed in claim 7;
an inner ring having at least one raceway surface;
an outer ring having at least one raceway surface; and
a plurality of rolling elements located between the raceway surface of the inner ring and the raceway surface of the outer ring,
wherein the sealing device is located so as to seal an opening on at least one side in the axial direction of a rolling elements compartment which is defined between an outer periphery of the inner ring and an inner periphery of the outer ring and which contains the rolling elements;
wherein the slinger of the scaling device is fixed to the inner ring; and
wherein a seal member including the elastic member and the metal core of the sealing device is fixed to the outer ring.

11. A rolling bearing for a wheel comprising:
a sealing device as claimed in claim 7;
an inner shaft having a first raceway surface;
an inner ring fixed to the inner shaft and having a second raceway surface;
an outer ring having a third raceway surface and a fourth raceway surface;
a plurality of first rolling elements located between the first raceway surface and the third raceway surface; and
a plurality of second rolling elements located between the second raceway surface and the fourth raceway surface,
wherein the sealing device is located so as to seal an opening on at least one side in the axial direction of a rolling elements compartment which contains the rolling elements, the rolling elements compartment being defined by an inner periphery of the outer ring and portions facing the inner periphery of the outer ring in the radial direction of outer peripheries of each of the inner shaft and the inner ring;
wherein the slinger of the sealing device is fixed to the inner ring; and
wherein a seal member including the elastic member and the metal core of the sealing device is fixed to the outer ring.

* * * * *

UNITED STATES PATENT AND TRADEMARK OFFICE
CERTIFICATE OF CORRECTION

PATENT NO. : 8,202,006 B2  
APPLICATION NO. : 12/311973  
DATED : June 19, 2012  
INVENTOR(S) : Tabata et al.

Page 1 of 1

It is certified that error appears in the above-identified patent and that said Letters Patent is hereby corrected as shown below:

Title Page,

Delete "(73) Assignee: Koyo Sealing Techno Co., Ltd., Tokushima (JP)"

Insert -- (73) Assignee: JTEKT Corporation, Osaka, (JP)
                        Koyo Sealing Techno Co., Ltd., Tokushima (JP) --.

Signed and Sealed this  
Twentieth Day of November, 2012

David J. Kappos  
*Director of the United States Patent and Trademark Office*